US 9,424,367 B2

(12) United States Patent
Baarz et al.

(10) Patent No.: US 9,424,367 B2
(45) Date of Patent: Aug. 23, 2016

(54) INTERACTIVE VISUALIZATION OF TRENDING DATA

(71) Applicant: Adobe Systems Incorporated, San Jose, CA (US)

(72) Inventors: Ryan S. Baarz, Provo, UT (US); Cameron R. Cowan, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 211 days.

(21) Appl. No.: 13/956,183

(22) Filed: Jul. 31, 2013

(65) Prior Publication Data

US 2015/0040047 A1 Feb. 5, 2015

(51) Int. Cl.
*G06F 3/048* (2013.01)
*G06F 17/30* (2006.01)
*G06F 3/0486* (2013.01)

(52) U.S. Cl.
CPC ........ *G06F 17/30994* (2013.01); *G06F 3/0486* (2013.01)

(58) Field of Classification Search
CPC .................... G06F 17/30873; G06F 17/30905; G06F 3/0481; G06F 3/0486; G06F 9/4443
USPC ......... 715/764, 769, 816, 817, 819, 825, 854, 715/863
See application file for complete search history.

(56) References Cited

U.S. PATENT DOCUMENTS

| 2010/0005411 | A1* | 1/2010 | Duncker | ........... G06F 17/30873 715/769 |
| 2012/0023429 | A1* | 1/2012 | Medhi | ........................... 715/772 |
| 2013/0289774 | A1* | 10/2013 | Day | .................. G05D 23/1919 700/276 |
| 2013/0332862 | A1* | 12/2013 | Mirra | ..................... G06Q 40/06 715/760 |
| 2014/0075380 | A1* | 3/2014 | Milirud | ................. G06F 11/323 715/810 |

* cited by examiner

*Primary Examiner* — Linh K Pham
*Assistant Examiner* — Wendy Nicholas
(74) *Attorney, Agent, or Firm* — Wolfe-SBMC

(57) ABSTRACT

In embodiments of interactive visualization of trending data, a data visualization interface includes a charting region to display data in one of multiple chart formats, and the data visualization interface further includes data cards, each selectable to initiate a display of the data in one of the multiple chart formats. A data charting application is implemented to receive a request to display the data visualization interface at a client device, receive a user input selecting a data card to chart the data in a chart format associated with the data card, obtain the data that correlates to the selected data card from a database, and initiate a display of the data in the charting region of the data visualization interface in the chart format based on the selected data card.

20 Claims, 6 Drawing Sheets

INTERACTIVE VISUALIZATION OF TRENDING DATA

BACKGROUND

Presenting data in different formats, such as in various charts, tables and graphs can be inconvenient when changing from one format to another, such as when transferring data from a grid-based data view to any number of different chart views of the data. The user workflow is often interrupted during the data analysis process to change from one data presentation format to another. For example, a user may have to use a third-party application, or export data and updates to a different database interface application than the one in use, and then convert back to a visualization library application. A data visualization application may also be limited in the ways in which data can be presented.

SUMMARY

This Summary introduces features and concepts of interactive visualization of trending data, which is further described below in the Detailed Description and/or shown in the Figures. This Summary should not be considered to describe essential features of the claimed subject matter, nor used to determine or limit the scope of the claimed subject matter.

Interactive visualization of trending data is described. In embodiments, a data visualization interface includes a charting region to display data in one of multiple chart formats, and the data visualization interface further includes data cards, each selectable to initiate a display of the data in one of the multiple chart formats. A data charting application is implemented to receive a request to display the data visualization interface at a client device, receive a user input selecting a data card to chart the data in a chart format associated with the data card, obtain the data that correlates to the selected data card from a database, and initiate a display of the data in the charting region of the data visualization interface in the chart format based on the selected data card.

In embodiments, each of the data cards in the data visualization interface is implemented to display the data in the chart format associated with a respective data card. The data charting application can obtain updates to the data from the database and revise the data that is displayed in the charting region of the data visualization interface to reflect the updates to the data. The data charting application can also revise the data that is displayed in each of the data cards in the data visualization interface to reflect the updates to the data in the chart format associated with a respective data card.

In embodiments, a user input selecting a data card can be received as a drag-and-drop input, where a selected data card is dragged over the charting region of the data visualization interface and dropped to initiate the display of the data in the chart format based on the selected data card. The data charting application can receive additional user inputs selecting different data cards to chart the data in alternate chart formats associated with the different data cards, and revise the data that is displayed in the charting region of the data visualization interface to an alternate chart format based on a selected different data card. A user input selecting a data card can also be received as a selection of a subset of data entries of the data card. The data charting application can then obtain the data that correlates to the subset of the data entries from the database, and initiate a display of the data for the subset of the data entries in the charting region of the data visualization interface in the chart format based on the selected data card.

BRIEF DESCRIPTION OF THE DRAWINGS

Embodiments of interactive visualization of trending data are described with reference to the following Figures. The same numbers may be used throughout to reference like features and components that are shown in the Figures.

DETAILED DESCRIPTION

Embodiments of interactive visualization of trending data are described, which enables an interactive visualization of data as it is trending and changing over time, and gives context to the data as it is trending. A data visualization interface has a charting region that displays data, or segments of the data, in different chart formats associated with selected data cards that are interactive. A user can intuitively drag-and-drop a selected data card onto the charting region of the data visualization interface, and the charting region automatically updates to display an interactive visualization of data according to data metrics of the selected data card. Further, a user can select to chart entire grids of data, single rows of data, or selected rows of data, and drop them onto the charting region of the data visualization interface to see a graph of the data in the chart format that is associated with a selected data card.

A user analyst can determine insights to data progression with the various, different charting formats of the data cards by dragging-and-dropping the data cards onto the charting region of the data visualization interface. The data and/or data segments can be analyzed without interrupting user workflow by charting and/or changing trending data nearly immediately. The user analyst can look for visual patterns through the interaction of the data chart formats, which tend to illustrate the data trends through the data visualizations. In implementations, embodiments of interactive visualization of trending data is applicable to search marketing, search advertising, display advertising, social marketing, and any other type of campaign advertising so that a user can analyze advertising data and information.

While features and concepts of interactive visualization of trending data can be implemented in any number of different devices, systems, networks, environments, and/or configurations, embodiments of interactive visualization of trending data are described in the context of the following example devices, systems, and methods.

Figure 1:
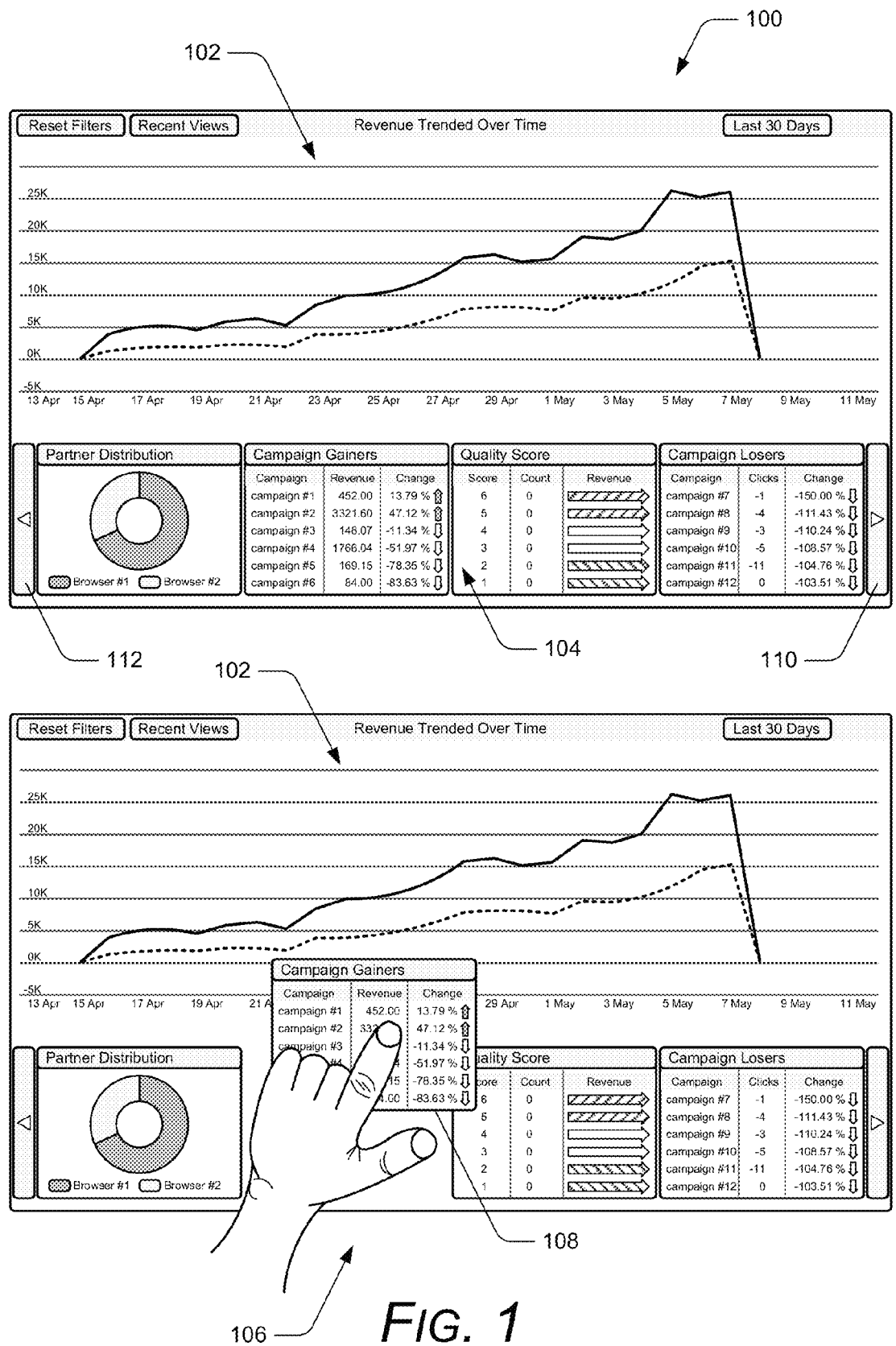
FIG. 1 illustrates an example data visualization interface in accordance with one or more embodiments of interactive visualization of trending data.

FIG. 1 illustrates an example of a data visualization interface 100 in embodiments of interactive visualization of trending data. The data visualization interface 100 may also be referred to as an interactive data visualization dashboard, that displays data, or segments of the data. The data visualization interface 100 includes a charting region 102 that is implemented to display a graphical representation of selected data, or segments of the data, in one of multiple chart formats. In this example, the charting region is shown displaying data in a line chart format as revenue trended over time, such as the total revenue for several different products over the last thirty days. The charting region 102 can display any type of line charts, bar charts, scatter plots, or other types of data visualization histograms.

The data visualization interface 100 also includes data cards 104 that display data and/or data segments, each in different formats based on the different metrics of each data card. The data cards are each selectable to initiate a display of the data and/or data segments in one of the different chart formats in the charting region 102 of the data visualization interface. For example, as shown at 106, a user can select a data card 108 to chart the data in a chart format that is associated with the selected data card. The data visualization interface 100 is implemented so that a user input can be received as a drag-and-drop input to select the data card 108 that is dragged over the charting region 102 of the data visualization interface and dropped to initiate a display of the data in the chart format based on the selected data card. The charting region of the data visualization interface then updates to present a trended view of the data or data segment of a selected data card that is dropped onto the charting region.

A user can also navigate to other data cards than just the four shown in this example for partner distribution, campaign gainers, quality score, and campaign losers. Any number of data cards 104 can be displayed by user selection of a forward carousel control 110 and/or a back carousel control 112 to display other data cards that are displayed for selection in a carousel of the data cards. Further, a user can select to chart entire grids of data, single rows of data, or selected rows of data from a data card 104, and drop them onto the charting region 102 of the data visualization interface 100 to see a graph of the data in the chart format that is associated with a selected data card. The user can then analyze the data and/or data segments without interrupting user workflow by charting and/or changing the trending data nearly immediately with the various, different data cards.

In an interactive data visualization system, a cloud-based data service provides an on-line, Web-based data charting application that a user can log into from a computing device and display the data visualization interface 100. The data service also maintains the data and/or segments of the data that is displayed in the charting region 102 of the data visualization interface, and also the data that is displayed in each of the data cards 104 of the data visualization interface. An example of an interactive data visualization system is described further with reference to FIG. 3.

Figure 2:
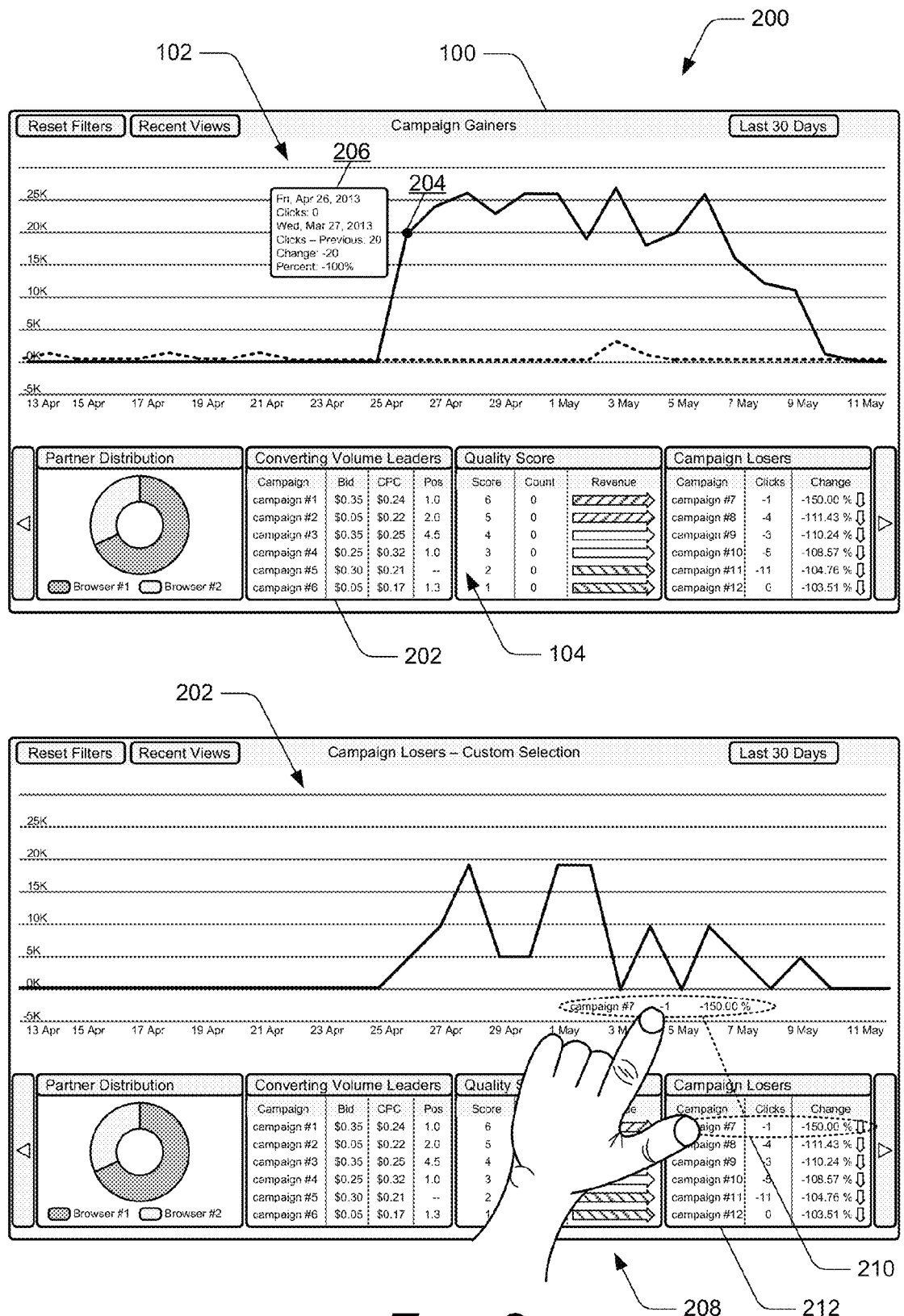
FIG. 2 further illustrates the data visualization interface in embodiments of interactive visualization of trending data.

FIG. 2 illustrates another example 200 of an implementation for embodiments of interactive visualization of trending data. The example 200 shows the data visualization interface 100 with the charting region 102 updated to display a graphical representation of the selected data for campaign gainers, such as to show a change over time comparing a current month to a previous month and/or day by day over a particular month. The selected data displayed in the charting region 102 of the data visualization interface 100 corresponds to the data card 108 shown in FIG. 1 as the drag-and-drop input over the charting region of the data visualization interface. Another data card 202 with data metrics for converting volume leaders is shown having replaced the data card 108 in the carousel of the data cards 104. The data visualization interface 100 in this example also illustrates that any data point 204 in the charting region 102 of the data visualization interface can be selected, and information 206 that corresponds to the selected data point 204 can be displayed for viewing.

In implementations, a user can select to chart a subset of the data as single rows of data from a data card, or several selected rows of data from a data card, and drop them onto the charting region 102 of the data visualization interface 100 to initiate the graphical representation of the selected data, or segments of the data. For example, as shown at 208, a user can select a data row 210 from a data card 212 to chart the single row of data (e.g., a subset of the data) in a chart format that is associated with the selected data card. A user may also select several data rows from the data card, such as by conventional input techniques holding down the shift and/or control keys on a keyboard and selecting the several data rows. The data visualization interface 100 receives the user input of the single data row 210 as a drag-and-drop input over the charting region 102 of the data visualization interface, and the selected data row is dropped to initiate a display of the data in the chart format associated with the data card 212. The charting region of the data visualization interface then updates to present a trended view of the selected data segment that is dropped onto the charting region.

Figure 3:
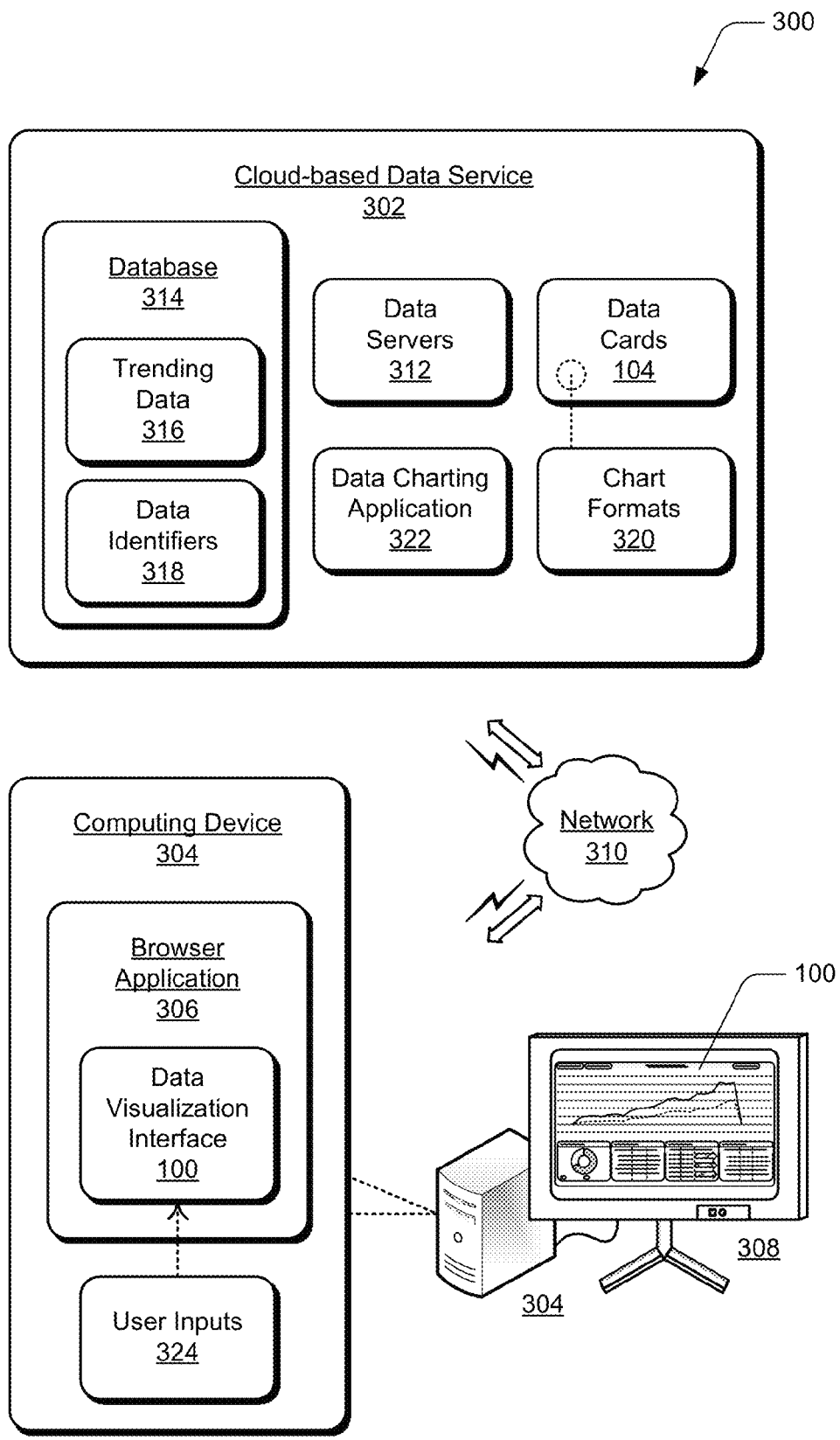
FIG. 3 illustrates an example system in which embodiments of interactive visualization of trending data can be implemented.

FIG. 3 illustrates an example system 300 in which embodiments of interactive visualization of trending data can be implemented. The example system 300 includes a cloud-based data service 302 that a user can access via a computing device 304, such as any type of computer, mobile phone, tablet device, and/or other type of computing device. The computing device 304 can be implemented with a browser application 306 through which a user can access the data service 302 and initiate a display of the data visualization interface 100, also shown on a display device 308 that is connected to the computing device. The computing device 304 can be implemented with various components, such as a processing system and memory, and with any number and combination of differing components as further described with reference to the example device shown in FIG. 6.

In an implementation, the cloud-based data service 302 is an example of a network service utilized by advertisers to facilitate tracking data for advertising campaigns. An advertiser can input and store all of the advertising information and keywords used for advertising campaigns at the data service. The data service 302 can also receive reporting data, such as from any one or more of the commonly used Internet search engines, as well as advertising campaign conversion data that is returned from tracking Websites. The advertising data and information is all collected and stored at the data service where it can then be accessed and analyzed, such as by an advertiser (e.g., a user analyst) at the computing device 304 who analyzes the data, charts, graphs, and reports for marketing trends and any other types of data analytics.

Any of the devices, data servers, and networked services described herein can communicate via a network 310, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 302 includes data servers 312 that may be implemented as any suitable memory, memory device, or electronic data storage for network-based data storage, and the data servers communicate data to computing devices via the network 310. The data servers 312 maintain a database 314 of trending data 316, such as any type of data and information associated with advertising campaigns, click-through conversions, and other tracked data that is collected and communicated to the data service. The data service 302 maintains the data (e.g., the trending data 316, updated data, etc.) that is displayed in the charting region 102 of the data visualization interface 100, as well as the data that is displayed in each of the data cards 104 of the data visualization interface. In implementations, the trending data 316 can be identified by data identifiers 318. Each of the data cards 104 in the different chart formats 320 include that data identifiers 318 for the data, or data segments, that are associated with a particular data card, and each of the data items can be tracked and updated as data objects.

In embodiments, the data cards 104 are customizable and can be configured in the data visualization interface 100 for the metrics that a user may want to see displayed. The data cards 104 may also be fully customizable by a user to create and select the metrics to be displayed, how the metrics and data is sorted, and how many rows of data are displayed at one time, as well as any other information that may be associated with a data card for data visualization.

The cloud-based data service 302 includes a data charting application 322, such as a software application (e.g., executable instructions) that is executable with a processing system to implement embodiments of interactive visualization of trending data. The data charting application 322 can be stored on computer-readable storage media, such as any suitable memory device or electronic data storage implemented by the data servers 312. Further, the data service can include any server devices and applications, and can be implemented with various components, such as a processing system and memory, as well as with any number and combination of differing components as further described with reference to the example device shown in FIG. 6.

In embodiments, the data charting application 322 is implemented to receive a request to display the data visualization interface 100, such as when a user at the computing device 304 initiates a user input 324 to access and display the data visualization interface on the display device 308 of the computing device. The computing device 304 communicates the user inputs 324 to the data service 302 via the network 310, where the data charting application 322 receives the user inputs. The data charting application 322 can then receive another user input 324 selecting a data card 104 to chart the data in a chart format associated with the data card. For example, as shown and described with reference to FIG. 1, the data charting application receives the drag-and-drop input to select the data card 108 that is dragged over the charting region 102 of the data visualization interface 100 and dropped to initiate a display of the data in the chart format based on the selected data card. Similarly, as shown and described with reference to FIG. 2, the data charting application receives the user input of the single data row 210 as the drag-and-drop input over the charting region 102 of the data visualization interface 100, and the selected data row is dropped to initiate a display of the data in the chart format associated with the data card 212.

When a data card 104, or a selection of data rows 210, is dropped on the charting region 102 of the data visualization interface 100 as described above, an event is registered with the data charting application 322 and an event object includes the data identifiers 318 for each of the data rows and/or data segment of the selected data card. The data charting application 322 is implemented to obtain the trending data 316 that correlates to the selected data card from the database 314 based on the data identifiers 318 of the selected data card, format the data in the chart format that is associated with the selected data card, and initiate the display of the data in the charting region 102 of the data visualization interface 100 in the chart format based on the selected data card. The data service 302 can then communicate the trending data 316 to the computing device 304 where the data visualization interface is displayed, such as through the browser application 306 and displayed on the display device 308 of the computing device.

The data charting application 322 can also receive additional user inputs that select different data cards to chart the data in alternate chart formats associated with the different data cards, and initiate revising the data displayed in the charting region 102 of the data visualization interface 100 to an alternate chart format based on a selected data card. The data charting application 322 can also obtain updates to the data from the database 314, and revise the data displayed in the charting region of the data visualization interface to reflect the updates to the data. Additionally, the data charting application 322 can be implemented to automatically determine the best visualization for the data 316, or a data segment in a chart format, so that a user does not have to invest the time to setup the data display and chart formats of the data cards.

Example methods 400 and 500 are described with reference to respective FIGS. 4 and 5 in accordance with one or more embodiments of interactive visualization of trending data. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 4:
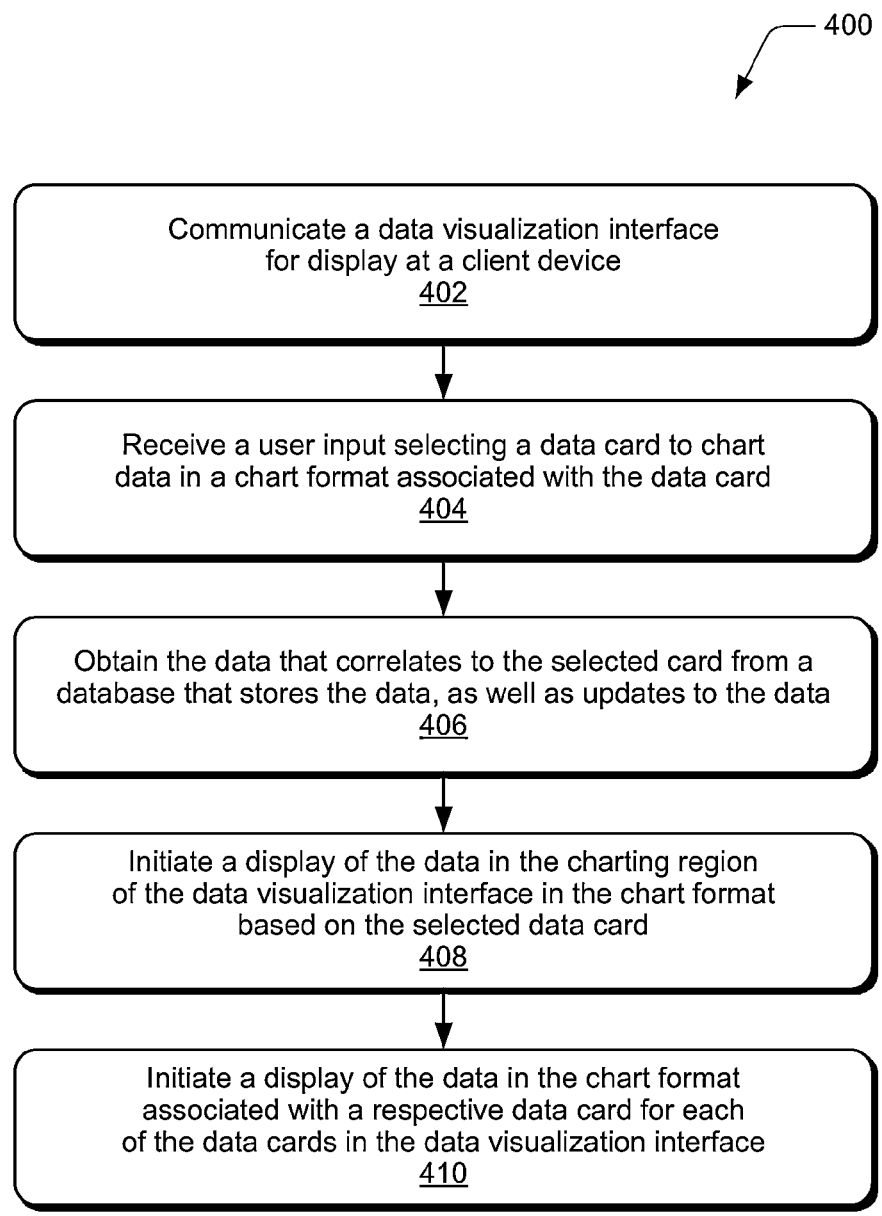
FIG. 4 illustrates example method(s) of interactive visualization of trending data in accordance with one or more embodiments.

FIG. 4 illustrates example method(s) 400 of interactive visualization of trending data, and is generally described with reference to a data charting application implemented by a server device at a data service. The order in which the method is described is not intended to be construed as a limitation, and any number or combination of the method operations can be combined in any order to implement a method, or an alternate method.

At 402, a data visualization interface is communicated for display at a client device. For example, a data server 312 implemented at the data service 302 (FIG. 3) communicates the data visualization interface 100 for display at the computing device 304, such as when a user of the computing device logs into the data service and via the browser application 306, initiates a request to view the data visualization interface. The data visualization interface 100 includes the charting region 102 to display data in one of multiple chart formats 320, and the data visualization interface includes the data cards 104, each selectable to initiate a display of the data in one of the multiple chart formats.

At 404, a user input selecting a data card is received to chart data in a chart format associated with the data card. For example, the data charting application 322 implemented at the data service 302 receives the user input 324 via the data visualization interface 100 at the computing device 304 to chart the data 316 in a chart format 320 associated with the data card 104. In embodiments, the user input selecting the data card is received as a selection of only a subset of data entries of the data card. For example, a user at the computing device may select the subset of the data (e.g., the data row 210) of the data card 212. The user input selecting the data card (or a subset of data entries of the data card) can be a drag-and-drop input that is dragged over the charting region 102 of the data visualization interface 100 and dropped to initiate the display of the data in the chart format based on the selected data card.

At 406, the data that correlates to the selected card is obtained from a database that stores the data, as well as updates to the data. For example, the data charting application 322 at the data service 302 obtains the data 316 that correlates to the selected data card from the database 314. Alternatively, the data charting application 322 obtains the data 316 that correlates to the subset of the data entries from the database 314 if the user input selecting the data card (at 404) is received as a selection of only a subset of data entries of the data card. In implementations, a selected data card 104 includes the data identifiers 318, and the data charting application 322 obtains the data and/or updates to the data from the database 314 based on the data identifiers of a selected data card.

At 408, a display of the data is initiated in the charting region of the data visualization interface in the chart format based on the selected data card. For example, the data charting application 322 at the data service 302 initiates a display of the data 316 at the computing device 304 in the charting region 102 of the data visualization interface 100 in the chart format based on the selected data card. The data charting application 322 may also initiate the display of the data for the subset of the data entries in the charting region of the data visualization interface in the chart format based on the selected data card if the user input selecting the data card (at 404) is received as a selection of only a subset of data entries of the data card. The data service 302 communicates the data 316 to the computing device 304 for display.

At 410, a display of the data is initiated in the chart format associated with a respective data card for each of the data cards in the data visualization interface. For example, the data charting application 322 at the data service 302 initiates a display of the data at the computing device 304 for each of the data cards 104 in the data visualization interface 100, where the data is displayed in the chart format associated with a respective data card.

Figure 5:
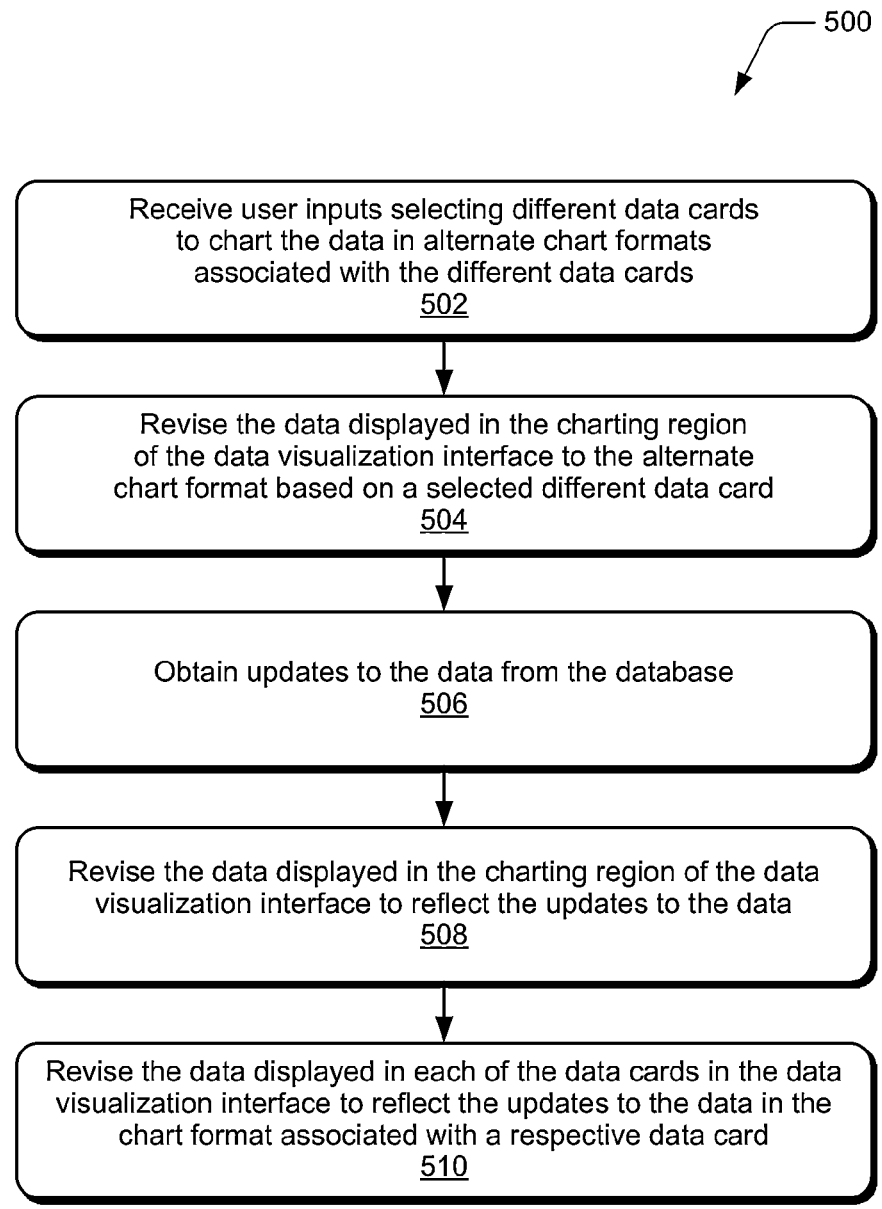
FIG. 5 illustrates example method(s) of interactive visualization of trending data in accordance with one or more embodiments.

FIG. 5 illustrates example method(s) 500 of interactive visualization of trending data, and is generally described with reference to a data charting application implemented by a server device at a data service. The order in which the method is described is not intended to be construed as a limitation, and any number or combination of the method operations can be combined in any order to implement a method, or an alternate method.

At 502, user inputs are received selecting different data cards to chart data in alternate chart formats associated with the different data cards. For example, the data charting application 322 implemented at the data service 302 receives user inputs 324 selecting different data cards 104 to chart the data 316 in alternate chart formats associated with the different data cards. A first user input may be received to select a data card to initiate a display of the data in the charting region 102 of the data visualization interface 100 in the chart format based on the selected data card, as described above with reference to FIG. 4 (404-408). Additional user inputs may then be received, such as to select a different data card to chart the data in an alternate chart format associated with the different data card.

At 504, the data displayed in the charting region of the data visualization interface is revised to the alternate chart format based on a selected different data card. For example, the data charting application 322 at the data service 302 initiates revising the data displayed at the computing device 304 in the charting region 102 of the data visualization interface 100 to the alternate chart format based on a selected different data card. At 506, updates to the data are obtained from the database. For example, the data charting application 322 at the data service 302 obtains updates to the data 316 from the database 314, such as based on the data identifiers 318.

At 508, the data displayed in the charting region of the data visualization interface is revised to reflect the updates to the data and, at 510, the data displayed in each of the data cards in the data visualization interface is revised to reflect the updates to the data in the chart format associated with a respective data card. For example, the data charting application 322 at the data service 302 initiates revising the data displayed at the computing device 304 in the charting region 102 of the data visualization interface 100 in the chart format based on the updates to the data. The data charting application 322 also initiates revising the data displayed in each of the data cards 104 in the data visualization interface 100 to reflect the updates to the data in the chart format associated with each respective data card. The data service 302 communicates the updates for the data 316 to the computing device 304 for display, such as on the display device 308 that is connected to the computing device.

Figure 6:
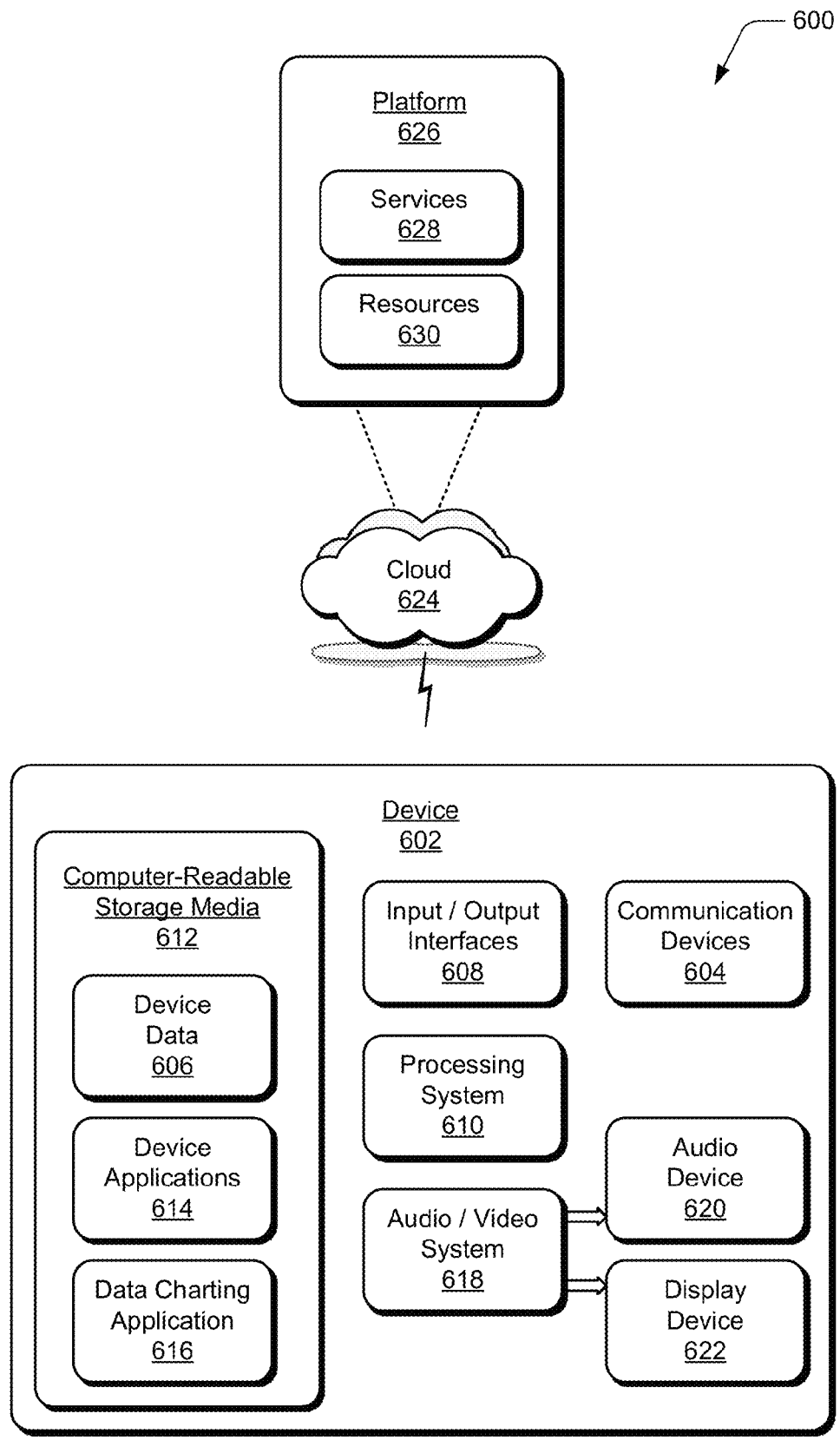
FIG. 6 illustrates an example system with an example device that can implement embodiments of interactive visualization of trending data.

FIG. 6 illustrates an example system 600 that includes an example device 602, which can implement embodiments of interactive visualization of trending data. The example device 602 can be implemented as any of the devices and/or server devices described with reference to the previous FIGS. 1-5, such as any type of client device, mobile phone, tablet, computing, communication, entertainment, gaming, media playback, and/or other type of device. For example, the computing device 304 and the data service 302, as well as any devices and data servers of the data service, shown in FIGS. 1-3 may be implemented as the example device 602.

The device 602 includes communication devices 604 that enable wired and/or wireless communication of device data 606, such as the trending data, updates to the data, and the data identifiers of the data. The device data can include any type of audio, video, and/or image data, as well as the trending data and the data identifiers. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device that may be integrated with device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 612, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 612 provides storage of the device data 606 and various device applications 614, such as an operating system that is maintained as a software application with the computer-readable storage media and executed by the processing system 610. In this example, the device applications also include a data charting application 616 that implements embodiments of interactive visualization of trending data, such as when the example device 602 is implemented as the data service 302 shown in FIG. 3. An example of the data charting application 616 includes the data charting application 322 implemented at the data service 302, as described with reference to FIG. 3.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for interactive visualization of trending data may be implemented in a distributed system, such as over a "cloud" 624 in a platform 626. The cloud 624 includes and/or is representative of the platform 626 for services 628 and/or resources 630. For example, the services 628 may include the data service 302 as described with reference to FIG. 3. Additionally, the resources 630 may include the data charting application 322 that is implemented at the data service as described with reference to FIG. 3.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of interactive visualization of trending data have been described in language specific to features and/or methods, the appended claims are not necessarily limited to the specific features or methods described. Rather, the specific features and methods are disclosed as example implementations of interactive visualization of trending data.

The invention claimed is:

1. An interactive data visualization system, comprising:
a database configured to store data and updates to the data;
a data visualization interface that includes a charting region configured to display the data in one of multiple chart formats, the data visualization interface further includes data cards, each selectable to initiate a display of the data in one of the multiple chart formats, each data card having an associated chart format to visualize the data in each data card;
a processing system of a server device to implement a data charting application that is configured to:
receive a request to display the data visualization interface at a client device;
receive a first user input as a first drag-and-drop input selecting a first subset of data entries from a first data card to chart the data, the first subset of the data entries being one or more rows of data from the first data card;
obtain the data that correlates to the one or more rows of the data from the first data card from the database;
initiate a display of the one or more rows of the data for a trended view of the selected first subset of the data entries in the charting region of the data visualization interface in the associated chart format for the first data card based on the selected first subset of the data entries from the first data card;
receive a second user input as a second drag-and-drop input selecting a second subset of data entries from a second data card to chart the data;
obtain the data that correlates to the selected second subset of the data entries from the second data card from the database; and
revise the charting region of the data visualization interface to display the selected second subset of the data entries of the data in the charting region of the data visualization interface in the associated chart format for the second data card based on the selected second subset of the data entries from the second data card.

2. The interactive data visualization system as recited in claim 1, wherein an additional user input selecting a data card is a drag-and-drop input comprising selection of the data card that is dragged over the charting region of the data visualization interface and dropped to initiate the display of the data in the associated chart format based on the selected data card.

3. The interactive data visualization system as recited in claim 2, wherein the selected data card includes data identifiers, and the data charting application is configured to obtain the data and the updates to the data from the database based on the data identifiers of the selected data card.

4. The interactive data visualization system as recited in claim 2, wherein the data charting application is configured to:
receive an additional user input selecting a different data card to chart the data in an alternate chart format associated with the different data card; and revise the data displayed in the charting region of the data visualization interface to the alternate chart format based on the selected different data card.

5. The interactive data visualization system as recited in claim 1, wherein the data charting application is configured to:
obtain the updates to the data from the database; and
revise the data displayed in the charting region of the data visualization interface to reflect the updates to the data.

6. The interactive data visualization system as recited in claim 1, wherein each of the data cards in the data visualization interface is configured to display the data in the chart format associated with a respective data card.

7. The interactive data visualization system as recited in claim 6, wherein the data charting application is configured to:
obtain the updates to the data from the database; and
revise the data displayed in each of the data cards in the data visualization interface to reflect the updates to the data in the chart format associated with a respective data card.

8. The interactive data visualization system as recited in claim 1, wherein the second user input selecting the second subset of the data entries from the second data card selects the second subset of the data entries as one or more rows of data from the second data card, and wherein the data charting application is configured to:
receive the second subset of the data entries of the second data card;
obtain the data that correlates to the one or more rows of the data of the second data card from the database; and
revise the display of the one or more rows of the data of the second data card for a trended view of the second subset of the data entries in the charting region of the data visualization interface in the associated chart format based on the selected second data card.

9. A method, comprising:
communicating a data visualization interface for display at a client device, the data visualization interface including a charting region configured to display data in one of multiple chart formats, the data visualization interface further including data cards, each selectable to initiate a display of the data in one of the multiple chart formats, each data card having an associated chart format to visualize the data in each data card;
receiving a first user input as a first drag-and-drop input selecting a first subset of data entries from a first data card to chart the data, the first subset of the data entries being one or more rows of data from the first data card;
obtaining the data that correlates to the one or more rows of the data from the first data card from a database that stores the data and updates to the data;
initiating a display of the one or more rows of the data for a trended view of the selected first subset of the data entries in the charting region of the data visualization interface in the associated chart format for the first data card based on the selected first subset of the data entries from the first data card;
receiving a second user input as a second drag-and-drop input selecting a second subset of data entries from a second data card to chart the data;
obtaining the data that correlates to the selected second subset of the data entries from the second data card from the database; and
revising the charting region of the data visualization interface to display the selected second subset of the data entries of the data in the charting region of the data visualization interface in the associated chart format for the second data card based on the selected second subset of the data entries from the second data card.

10. The method as recited in claim 9, wherein the first user input selecting the first subset of the data entries from the first data card is the first drag-and-drop input comprising selection of the selected subset of the data entries that are dragged over the charting region of the data visualization interface and dropped to initiate the display of the one or more rows of the data in the associated chart format for the first data card.

11. The method as recited in claim 9, wherein said obtaining the data comprises obtaining the data and the updates to the data from the database based on data identifiers of the selected first subset of the data entries from the first data card.

12. The method as recited in claim 9, further comprising:
receiving an additional user input selecting a data card to chart the data in an alternate chart format associated with the data card; and
revising the data displayed in the charting region of the data visualization interface to the alternate chart format based on the selected data card.

13. The method as recited in claim 9, further comprising:
obtaining the updates to the data from the database; and
revising the data displayed in the charting region of the data visualization interface to reflect the updates to the data.

14. The method as recited in claim 9, further comprising:
initiating a display of the data in the chart format associated with a respective data card for each of the data cards in the data visualization interface.

15. The method as recited in claim 14, further comprising obtaining the updates to the data from the database; and
revising the data displayed in each of the data cards in the data visualization interface to reflect the updates to the data in the chart format associated with a respective data card.

16. The method as recited in claim 9, further comprising:
receiving the second user input selecting the second subset of the data entries from the second data card as one or more rows of data from the second data card;
obtaining the data that correlates to the one or more rows of the data of the second data card from the database; and
revising the display of the one or more rows of the data of the second data card for a trended view of the second subset of the data entries in the charting region of the data visualization interface in the associated chart format for the second data card.

17. A non-transitory computer-readable storage memory comprising a data charting application stored as instructions that are executable and, responsive to execution of the instructions by a computing device, the computing device performs operations of the data charting application comprising to:
receive a request to display a data visualization interface at a client device, the data visualization interface including a charting region configured to display data in one of multiple chart formats, the data visualization interface further including data cards, each selectable to initiate a display of the data in one of the multiple chart formats, each data card having an associated chart format to visual the data in each data card;
receive a first user input as a first drag-and-drop input selecting a first subset of data entries from a first data card to chart the data, the first subset of the data entries being one or more rows of data from the first data card;
obtain the data that correlates to the one or more rows of the data from the first data card from a database;
initiate a display of the one or more rows of the data for a trended view of the selected first subset of the data entries in the charting region of the data visualization interface in the associated chart format for the first data card based on the selected first subset of the data entries from the first data card;

receive a second user input as a second drag-and-drop input selecting a second subset of data entries from a second data card to chart the data;

obtain the data that correlates to the selected second subset of the data entries from the second data card from the database; and revise the charting region of the data visualization interface to display the selected second subset of the data entries of the data in the charting region of the data visualization interface in the associated chart format for the second data card based on the selected second subset of the data entries from the second data card.

18. The non-transitory computer-readable storage memory as recited in claim 17, wherein the computing device performs the operations of the data charting application further comprising to receive the first user input selecting the first subset of the data entries from the first data card as the first drag-and-drop input comprising selection of the selected subset of the data entries that are dragged over the charting region of the data visualization interface and dropped to initiate the display of the one or more rows of the data in the associated chart format for the first data card.

19. The non-transitory computer-readable storage memory as recited in claim 17, wherein the computing device performs the operations of the data charting application further comprising to:

receive an additional user input selecting a data card to chart the data in an alternate chart format associated with the data card; and revise the data displayed in the charting region of the data visualization interface to the alternate chart format based on the selected data card.

20. The non-transitory computer-readable storage memory as recited in claim 17, wherein the computing device performs the operations of the data charting application further comprising to initiate a display of the data in the chart format associated with a respective data card for each of the data cards in the data visualization interface.

\* \* \* \* \*